March 22, 1955　　J. W. DUHAMEL ET AL　　2,704,455
APPARATUS FOR INDICATING HEIGHT
OF ELEVATED CONTACT MATERIAL
Filed Nov. 29, 1952
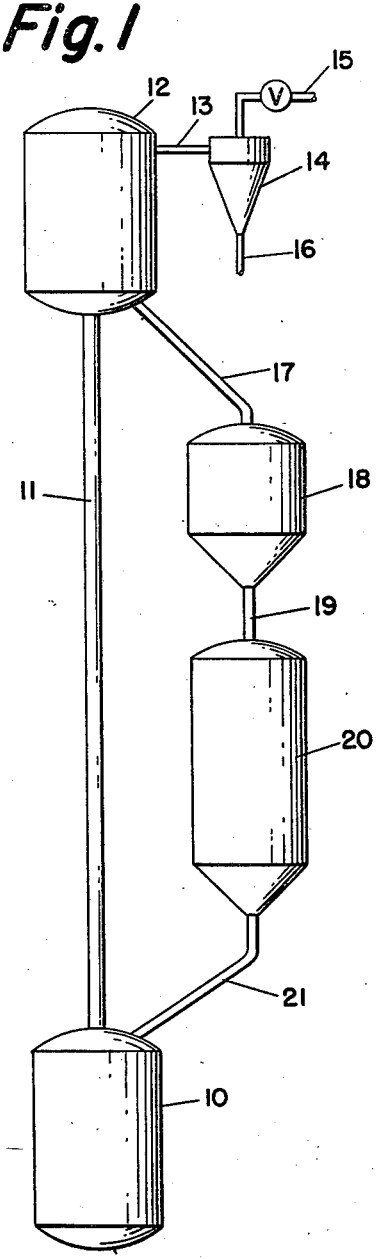
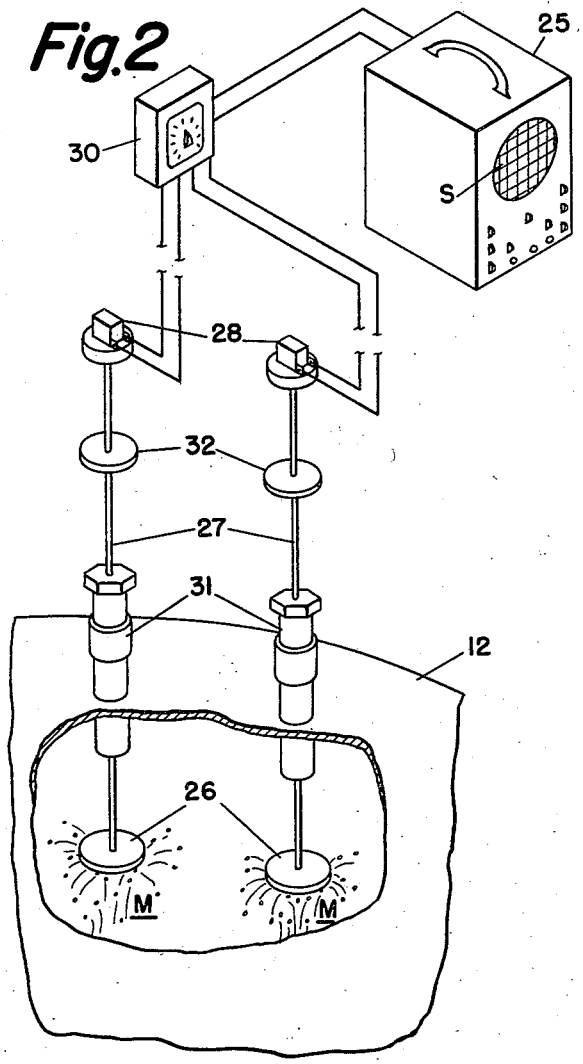
INVENTORS.
JAY W. DUHAMEL
HOWARD R. DAILY
BY
Robert O. Spurdle
ATTORNEY United States Patent Office 2,704,455
Patented Mar. 22, 1955

2,704,455

APPARATUS FOR INDICATING HEIGHT OF ELEVATED CONTACT MATERIAL

Jay W. Duhamel and Howard R. Daily, Toledo, Ohio, assignors to Sun Oil Company, Philadelphia, Pa., a corporation of New Jersey Application November 29, 1952, Serial No. 323,270

2 Claims. (Cl. 73—432)

This invention relates to apparatus for pneumatically elevating a stream of granular or pelleted contact material or catalyst from a lower receptacle into and upwardly through an elongate conduit to an upper receptacle from which it is directed to process equipment for effecting chemical or physical reactions. In particular the invention is directed to indicating at a remote point, the height of rise of the stream of material within the upper chamber.

It is well known in the art of catalysis, such as the cracking of heavier petroleum fractions to gasoline and other hydrocarbon processing operations, to use a catalyst or contact material in a continuous system. In such continuous systems a conversion zone is operated simultaneously with a second zone which is in regeneration. Most commercial moving or continuous catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic elevating or lifting medium. The present invention is concerned with the pneumatic conveyance of the material between the zones.

It is necessary in commercial systems employing conversion and regeneration zones in superposed relationship to pneumatically convey the catalyst or contact material through a conduit several hundred feet in height in order to elevate it from the lower zone to the upper zone. From the lower zone, it is the usual practice to deliver the material by gravity to a lowermost receptacle positioned at a level below that of the lower zone, from which receptacle it is necessary to effect or begin the lifting or upward conveying operation. In a pneumatic lifting system this lowermost receptacle is generally known in the art as an engager since the material is engaged therein by the lifting flue gas or air to effect the lifting operation. The lower end of the elevating conduit extends into or is in communication with the engager receptacle while the upper end of the elevating conduit communicates with an uppermost receptacle positioned at a level above the top of the upper zone. The uppermost receptacle is designed so that the elevating medium may be separated from the catalyst or contact material and is generally known in the art as the disengager.

The stream of material usually enters the disengager at very high velocity and unless some provision is made for decreasing its velocity, the stream of material will become attrited upon contact with the walls of the disengager with the resultant production of fines and an uneconomical commercial operation.

The present invention involves an arrangement or system for indicating at a remote point, the height of rise of the stream of material as it enters the disengager. The condition or height of rise of the stream is preferably determined instantaneously in order to provide for immediate adjustment of the velocity and reduce the attrition losses to a minimum.

A complete understanding of the invention may be had by reference to the following description taken in connection with the accompanying drawings which form a part of the application in which:

Figure 1 is an elevational view for schematically showing a typical catalytic cracking system employing a pneumatic lift for elevating pelleted catalyst or contact material.

Figure 2 is an enlarged fragmentary view of the disengager with the indicating apparatus shown diagrammatically.

Referring to Figure 1 of the drawing, which shows the conventional elements of a continuous system, a lower receptacle or chamber 10 functions as the catalyst engager, that is, a chamber wherein the catalyst is engaged by the lifting air, flue gas or steam supplied thereto by suitable means not shown.

The lift pipe or elevating conduit is indicated at 11 and has its lower end communicating with the engager 10 and its upper end communicating with an upper chamber 12 which is the disengager or chamber wherein the catalyst is disengaged from the air or other lifting or elevating medium. The lifting medium is discharged from the disengager 12 through a conduit 13 and is passed to any conventional separating means such as a cyclone separator 14 having an upper conduit 15 in communication therewith to remove the lifting medium and a lower conduit 16 in communication therewith for removing any fines which become entrained in the lifting medium.

The catalyst which remains in the disengager 12 is returned through conduit 17 by gravity to an upper reaction zone 18 wherein usually an on-stream reaction is effected to obtain the desired product and continues to flow therefrom through conduit 19 by gravity into a lower reaction zone 20 wherein the catalyst or contact material is regenerated to remove any deposits which might have been formed on the catalyst in the upper zone 18. From the lower zone 20 the catalyst or contact material continues to flow by gravity through conduit 21 and is returned to the engager 10. The conduits 17, 19, and 21 through which the catalyst or contact material flows in returning from the disengager 12 to the engager 10 are usually provided with means for supplying steam or other gaseous purging medium thereto in order to prevent reaction products formed in zone 18 and regeneration fumes formed in zone 20 from communicating with the other chambers in the unit.

In Figure 2 is shown the height of rise indicator apparatus or system associated with the disengager 12 and comprises an oscilloscope 25 which is located, for example, in the control room of a refinery and by which a visual indication of the stream of material entering the disengager 12 will be made. To this end a plurality of vibratory means or target discs 26 are positioned within the disengager in the path of travel of the contact material after it leaves the elevating conduit 11, to be contacted by the stream of particles and set up vibrations in the vibratory means. In actual practice a multiplicity of the discs 26 will be used and disposed at various levels within the disengager in order that particles of the material as the stream expands or spreads out upon entering the disengager will contact one or more of the discs.

The discs 26 as indicated are suspended from the lower ends of shafts 27 which preferably are solid in order to function effectively as sound transmitting means for carrying vibrations from the discs to sound pick-up devices 28 which are positioned above the discs preferably adjacent the other ends of the shafts. The sound pick-up devices may be any of the conventional electrical elements such as the carbon pile, condenser or crystal unit types which are capable of receiving the audible or sonic vibrations emanating from the discs 26 as they are contacted by the particles M which form the stream of material.

The pick-up devices 28 are designed to generate current in accordance with vibrations received from the discs 26 and the impulses developed in devices 28 are transmitted for reception by the oscilloscope 25 where they are amplified and transferred into images on the screen S of the oscilloscope.

Since a number of the discs 26 will be used a selector switch 30 is placed in circuit between all the pick-up devices and the oscilloscope in order to selectively transfer the impulses from any one pick-up device to the oscilloscope and show the height of rise of the contact material impinging on that particular disc.

Each shaft 27 for supporting a disc 26 is mounted in a packing gland indicated generally at 31 in order to permit adjustment of the position of any disc 26 and insure its contact by some of the particles forming the stream of material. At 32 are indicated stops which are secured to the shafts 27 so as to prevent the shafts from dropping into the disengager when the packings 31 are loosened for adjusting the position of the discs 26.

It is preferred to utilize an oscilloscope in the present indicating system since the existing condition or height of the stream within the disengager will be transferred to the screen S for immediate observation. However, it is within the purview of the present invention to use a recording device, such as an oscillograph which will graphically record the existing condition or height of the stream for later inspection or study. Such recording equipment should be arranged to automatically control the velocity of the material being elevated in order to prevent undue attrition losses.

The invention claimed is:

1. Apparatus for indicating the height of rise of a stream of contact material which is pneumatically elevated from a lower chamber to an upper chamber comprising a plurality of vibratory plates positioned at different heights within the upper chamber to be contacted by particles of the stream of material during their upward movement and set up vibrations therein, a plurality of vibration transmitting shafts, each of said shafts carrying a vibratory plate at its lower end and a vibration pick-up element thereabove, said pick-up elements being arranged to generate current impulses in accordance with vibrations received thereby and transmit said impulses, an oscilloscope exteriorly of said upper chamber for receiving said impulses from the pick-up elements to indicate visually the condition or height of rise of the stream within the upper chamber, and switching means for selectively passing the impulses from the pick-up elements to the oscilloscope.

2. Apparatus for indicating the height of rise of a stream of granular material which is pneumatically elevated from a lower chamber to an upper chamber comprising a plurality of vibratory plates positioned within the upper chamber to be contacted by particles of the stream of material during their upward movement and set up vibrations therein, a plurality of vibration transmitting shafts, each of said shafts carrying a vibratory plate at its lower end and a vibration pick-up element thereabove, said pick-up elements being arranged to generate current impulses in accordance with vibrations received thereby and transmit said impulses, an oscilloscope positioned exteriorly of the upper chamber for receiving said impulses and means between the pick-up elements and the oscilloscope for transmitting impulses from a selected pick-up element to indicate visually the condition or height of rise of granular material within the upper chamber.

References Cited in the file of this patent
UNITED STATES PATENTS

| | | |
|---|---|---|
| 1,902,184 | Rieber | Mar. 21, 1933 |
| 2,370,210 | Turner | Feb. 27, 1945 |
| 2,448,553 | Schutte et al. | Sept. 7, 1948 |
| 2,668,365 | Hogin | Feb. 9, 1954 |